United States Patent [19]

Gotoh

[11] Patent Number: 4,659,950
[45] Date of Patent: Apr. 21, 1987

[54] CHARGING GENERATOR FOR A VEHICLE
[75] Inventor: Hitoshi Gotoh, Himeji, Japan
[73] Assignee: Mitsubishi Denki Kabushiki Kaisha, Tokyo, Japan
[21] Appl. No.: 815,012
[22] Filed: Dec. 31, 1985
[30] Foreign Application Priority Data Jan. 12, 1985 [JP]  Japan .................. 60-2713[U]

[51] Int. Cl.$^4$ ............................................ H02K 9/00
[52] U.S. Cl. ........................................ 310/59; 310/62; 310/65; 310/89
[58] Field of Search ............... 310/58, 59, 60 R, 62, 310/63, 53, 64, 65, 89, 263, 52, 53

[56] References Cited
U.S. PATENT DOCUMENTS

| 3,209,184 | 9/1965 | Woodward | 310/59 |
| 3,243,617 | 3/1966 | Cunningham | 310/63 |
| 3,270,223 | 8/1966 | Seely | 310/62 |
| 4,055,778 | 10/1977 | Binder | 310/89 |

FOREIGN PATENT DOCUMENTS

| 0125834 | 11/1984 | European Pat. Off. | 310/63 |
| 3038031 | 4/1981 | Fed. Rep. of Germany | 310/58 |
| 0931616 | 2/1948 | France | 310/63 |
| 0067850 | 4/1984 | Japan | 310/63 |

Primary Examiner—R. Skudy
Attorney, Agent, or Firm—Oblon, Fisher, Spivak, McClelland & Maier

[57] ABSTRACT

A charging generator for a vehicle has a cooling means for a stator coil and a bearing held at the front bracket side in addition to a cooling means for the rear bracket. A partition plate is provided in the front bracket to separate a window for cooling into an air intake window and an air discharge window, and air is sucked from the air intake window to be discharged through the air discharge window in which the front bearing and the front side coil are cooled.

3 Claims, 2 Drawing Figures

CHARGING GENERATOR FOR A VEHICLE

BACKGROUND OF THE INVENTION

1. Field of the Invention

The present invention relates to a charging generator for a vehicle. More particularly, it relates to construction for cooling the front side of a charging generator for a vehicle.

2. Description of Prior Art

A typical construction for cooling the front side of a charging generator is conventionally that cooling air sucked through a suction window formed at the outer side of a front bearing is discharged from a discharge window formed at the outer circumferential part of a front bracket, while it cools the front bearing, the front side surface of a rotor and a portion of a coil facing the front side of a stator.

The conventional construction of the charging generator will be described in more detail with reference to FIG. 2.

In FIG. 2, a rear bracket 1 and a front bracket 4 are fastened with each other so as to form an outer casing of a charging generator. A rotary shaft 7 is rotatably supported by the front and rear brackets 4, 1 through the respective bearings 8, 5. A rotor 2 is fixedly mounted on the rotary shaft 7 so as to be rotatable therewith. A fan 2a is attached to the rotor 2 at the side of the rear bracket 1, and a fan 2b is attached to the rotor at the side of the front bracket 4 with some space 4d inside of it. A stator 3 is fixedly attached on the inner wall of the front bracket 4 in the vicinity of the joining portion of the front and rear brackets. A coil is wound on the stator 3. A reference numeral 3a designates a portion of the coil projecting to the rear bracket side, and a numeral 3b designates a portion of the coil projecting to the front bracket side. The rear bracket 1 is provided with air intake windows 1a at positions neighboring the bearing 8 and at least one air discharge window 1b at the circumferential portion of the rear bracket 1. The front bracket 4 is provided with at least one air discharge window 4b near the stator 3. A reference numeral 2c designates a space formed in the rotor 2.

In the conventional charging generator having the above-mentioned construction, cooling air sucked through the air intake windows 1a of the rear bracket 1 is passed into the front bracket to cool the rear side of the coil 3a by means of the rear side fan 2a and is discharged outside from the air discharge window 1b. In this case, a part of the cooling air is forced to pass through the space 2c of the rotor 2 by means of the front side fan 2b and is discharged outside from the air discharge window 4b of the front bracket 4, while the cooling air cools the front side of the coil 3b.

In the conventional charging generator, however, sufficient cooling effect can not be expected since the air to be fed to the front bracket side to cool the front side coil 3b is heated in the rear side space thereby becoming warm air, and there is stagnation of air in the space 4d in the front bracket 4. Particularly, there is remarkable increase in temperature in the front bearing 5, whereby the life time and the output performance of the charging generator are decreased.

SUMMARY OF THE INVENTION

It is an object of the present invention to provide a charging generator for a vehicle capable of effectively cooling a bearing and the other components in the front bracket by forming a cooling path in the front bracket side of the generator.

The foregoing and the outer objects of the present invention have been attained by providing a charging generator for a vehicle which comprises front and rear brackets fastened with each other, a rotary shaft rotatably supported by the front and rear brackets through bearings, a rotor mounted on the rotary shaft to be driven, a stator fixedly supported by the front bracket or the rear bracket, a window for cooling formed in the front bracket, and a partition plate placed in the front bracket to allow the window for cooling to perform both functions of sucking air and discharging air.

BRIEF DESCRIPTION OF THE DRAWINGS

Various other objects, features attendant advantages of the present invention will be more fully appreciated as the same becomes better understood from the following detailed description when considered in connection with the accompanying drawings in which like reference numerals designate the same or corresponding parts and wherein.

DETAILED DESCRIPTION OF THE PREFERRED EMBODIMENT

An embodiment of the present invention will be described with reference to FIG. 1.

Figure 1:
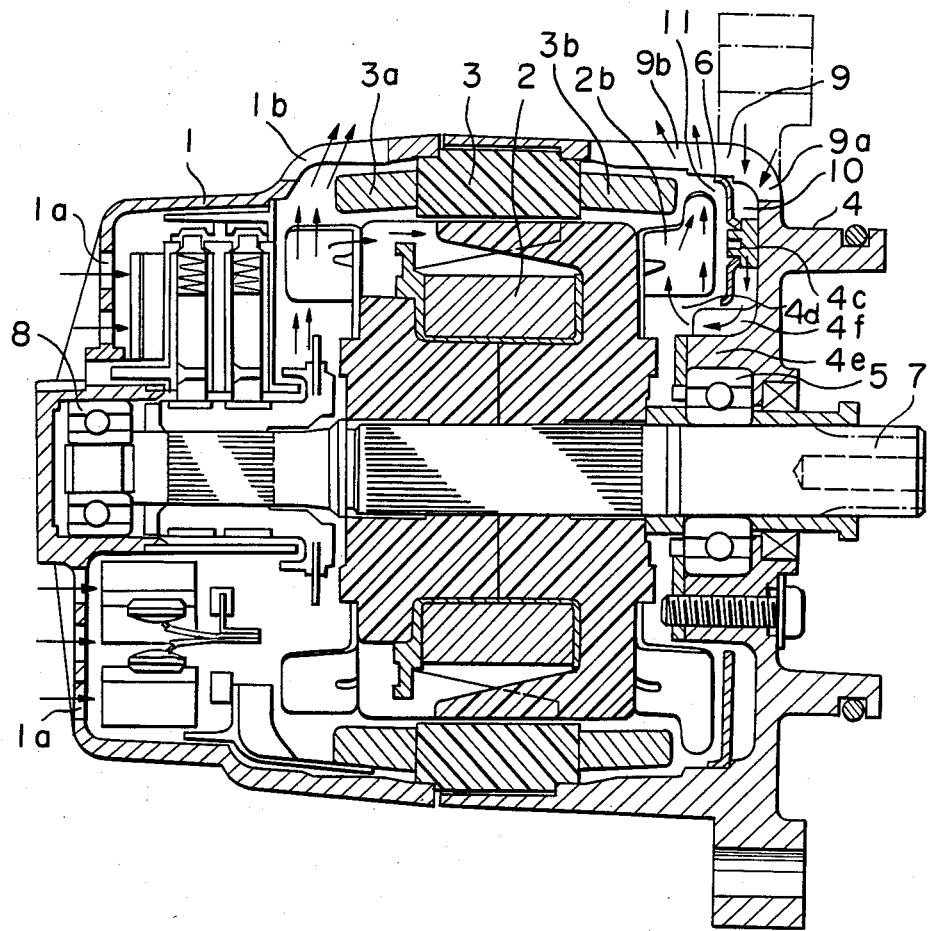
FIG. 1 is a longitudinal cross-sectional view of an embodiment of the charging generator according to the present invention.
Figure 2:
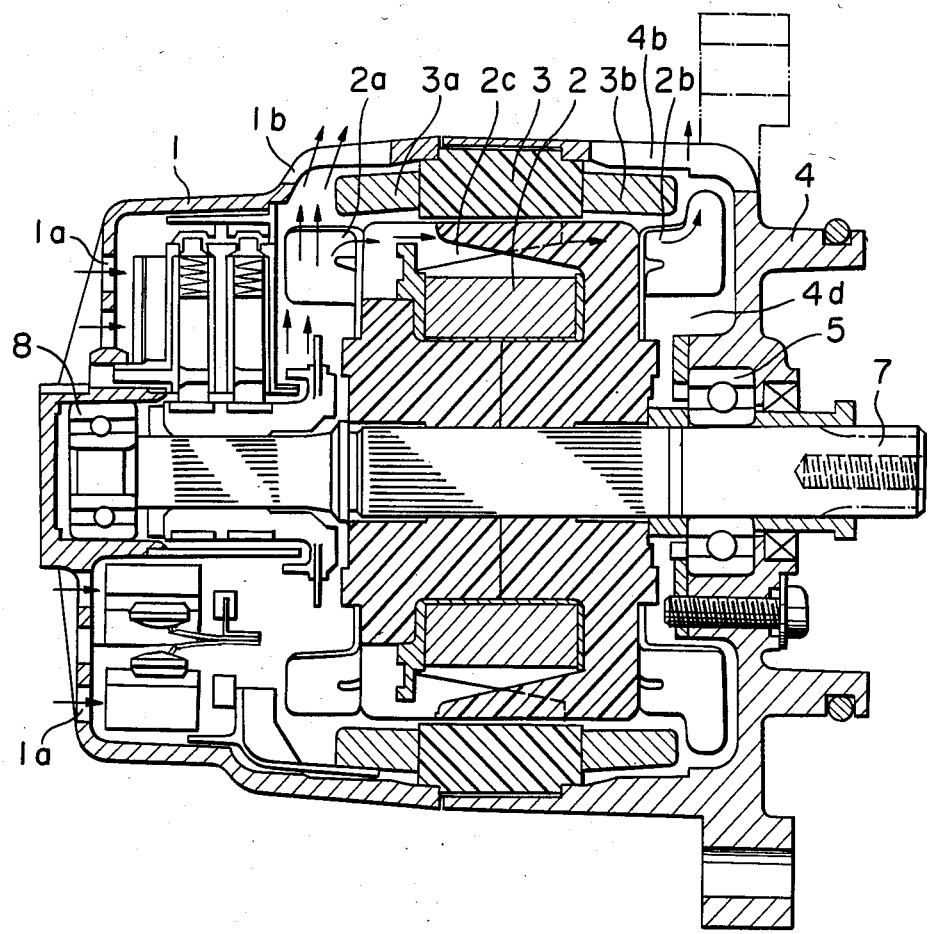
FIG. 2 is a longitudinal cross-sectional view of a conventional charging generator.

In FIG. 1, the same reference numerals as in FIG. 2 designate the same or corresponding parts, and therefore, description of these parts is omitted. The front and rear brackets define an annular casing having an axis, and a radially outer periphery and an annular casing having an axis, and a radially outer periphery and front and rear axial sidewalls defined by the brackets.

A window for cooling 9 is formed in the front bracket 4, which extends over the front side coil 3b from the upper portion of an upright wall of the front bracket 4. A partition plate 6 having a ring shape is fixed to the inner side wall of the front bracket 4 so as to be in parallel therewith and to provide a space between the partition plate 6 and the inner side wall, by means of at least one boss 4c. A space is also provided between the partition plate 6 and the side surface of the rotor 2 to which a front side fan 2b is attached. The outer circumferential part of the partition plate 6 extends to or near the window for cooling 9 to divide it into an air intake window 9a and an air discharge window 9b. An air inlet passage 10 formed between the partition plate 6 and the inner side wall of the front bracket 4 is communicated with the air intake window 9a, and an air discharge passage 11 formed between the partition plate 6 and the side surface of the rotor 2 attached with the front side fan 2b is communicated with the air discharge window 9b. The inner circumferential part of the ringed partition plate 6 extends near guide grooves or fins 4f provided in the outer circumference of a bearing housing 4e which holds the front bearing 5.

In the embodiment of the present invention, the window for cooling 9 formed in the front bracket 4 is divided by the partition plate 6 into the air intake window 9a and the air discharge window 9b, thus the window for cooling 9 is to perform both functions of air intake and air discharge. Accordingly, cooling air is sucked through the air intake window 9a by the sucking action of the front side fan 2b attached to the rotor 2; is fed downwardly in the air intake passage along the partition plate 6; cools the bearing housing 5 while passed through the fins 4f, and is discharged through the air discharge window 9b after cooling the front side coil 3b.

It is preferable to form a window for cooling wider than that in the conventional charging generator and to broaden the space 4d in the front bracket 4 to increase cooling effect for the front bearing 5 and the front side coil 3b.

It is possible to form two or more windows for cooling 9 in the front bracket 4.

Thus, in the present invention, a unique cooling path can be provided at the front bracket side by broadening the space in the front bracket and by providing a partition plate. In this case, the same cooling effect as a conventional standard charging generator can be obtained even by a charging generator having special structure. With the construction of the present invention, a life time of the charging generator is prolonged and output performance can be improved.

What is claimed is:

1. A charging generator for a vehicle, comprising:
   an annular casing having an axis, and having a radially outer periphery and front and rear axial side walls defined by axially spaced front and rear brackets which are fixed to one another;
   a rotary shaft extending through said casing along said axis and being rotatably supported by bearings of said front and rear brackets;
   a rotor mounted on said rotary shaft;
   a stator fixed to one of said brackets;
   at least one window in said front bracket, at least a portion of said at least one window extending along a portion of said outer periphery between said rotor and said front side wall; and
   partition plate fixed within said front bracket between said rotor and said front side wall, said partition plate extending radially to said at least one window and being spaced from said rotor and said front side wall to divide each said at least one window into an air intake window and an air discharge window, said air intake and discharge windows being connected by a radially extending air inlet passage on one side of said partition plate and a radially extending air discharge passage on the other side of said partition plate.

2. A charging generator for a vehicle according to claim 1 including a front side fan driven by said rotary shaft and positioned in one of said air passages.

3. A charging generator for a vehicle according to claim 2, wherein said partition plate is in a ring form and is supported by said front bracket by means of at least one boss projecting from said front side wall.

* * * * *